US012693899B2

(12) United States Patent
Cheleotis

(10) Patent No.: US 12,693,899 B2
(45) Date of Patent: Jul. 28, 2026

(54) SYSTEM AND METHODS FOR MODIFYING SCHEDULED RESOURCE TRANSFERS ASSOCIATED WITH DATA RECORDS

(71) Applicant: The Toronto-Dominion Bank, Toronto (CA)

(72) Inventor: Kyle Austin Cheleotis, Inman, SC (US)

(73) Assignee: The Toronto-Dominion Bank, Toronto (CA)

( * ) Notice: Subject to any disclaimer, the term of this patent is extended or adjusted under 35 U.S.C. 154(b) by 589 days.

(21) Appl. No.: 17/495,244

(22) Filed: Oct. 6, 2021

(65) Prior Publication Data

US 2023/0106705 A1     Apr. 6, 2023

(51) Int. Cl.
| | |
|---|---|
| *G06F 9/50* | (2006.01) |
| *G06Q 20/10* | (2012.01) |
| *G06Q 20/14* | (2012.01) |
| *G06Q 20/40* | (2012.01) |
| *G06Q 30/06* | (2023.01) |
| *G06Q 40/04* | (2012.01) |

(52) U.S. Cl.
CPC ........... *G06F 9/5027* (2013.01); *G06Q 20/10* (2013.01); *G06Q 20/145* (2013.01); *G06Q 20/405* (2013.01); *G06Q 40/04* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 7,089,503 B1 | 8/2006 | Bloomquist et al. | |
| 7,200,604 B2 | 4/2007 | Forman et al. | |
| 7,818,229 B2 | 10/2010 | Imrey et al. | |
| 8,701,984 B1 * | 4/2014 | Shirah .................... | G06Q 30/04 |
| | | | 235/379 |
| 8,930,307 B2 | 1/2015 | Colgrove et al. | |
| 9,785,945 B2 | 10/2017 | Groarke et al. | |
| 2008/0065633 A1 * | 3/2008 | Luo ...................... | G06F 16/9535 |
| 2009/0168092 A1 * | 7/2009 | Chen ..................... | G06F 9/5027 |
| | | | 358/1.15 |
| 2013/0046884 A1 * | 2/2013 | Frost ......................... | G06F 9/06 |
| | | | 709/224 |
| 2014/0039942 A1 * | 2/2014 | Groarke ............. | G06Q 20/4016 |
| | | | 705/5 |

(Continued)

*Primary Examiner* — Abu Zar Ghaffari
(74) *Attorney, Agent, or Firm* — Rowand LLP

(57) ABSTRACT

A computer-implemented method includes: receiving a first modification request for varying a first parameter associated with a resource transfer operation in connection with a data record; adding the first modification request to an input data object; receiving a second modification request for varying the first parameter; adding the second modification request to the input data object; determining that one of the first and the second modification requests is approved based on first criteria, wherein the determining includes sequentially processing, using a robotic process automation system, a plurality of modification requests of the input data object; in response to determining that one of the first and the second modification requests is approved: causing the first parameter to be varied; and generating a notification of approval for a requesting entity associated with the one of the first and the second modification requests.

15 Claims, 5 Drawing Sheets

(56) References Cited

U.S. PATENT DOCUMENTS

| | | | | |
|---|---|---|---|---|
| 2014/0162598 | A1* | 6/2014 | Villa-Real | G07F 7/0886 |
| | | | | 455/411 |
| 2015/0227629 | A1* | 8/2015 | Klensch | G06F 16/24545 |
| | | | | 707/718 |
| 2015/0309838 | A1* | 10/2015 | Steele | G06F 16/174 |
| | | | | 718/102 |
| 2016/0012465 | A1* | 1/2016 | Sharp | G06Q 20/321 |
| | | | | 705/14.17 |
| 2017/0359408 | A1* | 12/2017 | Kurian | H04L 47/83 |
| 2018/0041486 | A1* | 2/2018 | Way | H04L 63/08 |
| 2019/0179682 | A1* | 6/2019 | Spector | G06Q 40/03 |
| 2019/0362423 | A1* | 11/2019 | Hosman | G06Q 40/04 |
| 2019/0378118 | A1* | 12/2019 | Tunnell | G06Q 20/363 |
| 2020/0286174 | A1* | 9/2020 | Pessin | G06Q 40/06 |
| 2021/0103577 | A1* | 4/2021 | Asipov | G06F 18/217 |
| 2021/0118054 | A1* | 4/2021 | Turner | G06Q 10/10 |
| 2021/0256489 | A1* | 8/2021 | Jivan | G06Q 20/405 |
| 2021/0374861 | A1* | 12/2021 | McClelland | G06Q 20/40145 |
| 2022/0121992 | A1* | 4/2022 | Scavo | G06Q 10/06393 |
| 2022/0159054 | A1* | 5/2022 | Rose | G06F 3/0484 |
| 2022/0230174 | A1* | 7/2022 | Khare | H04L 9/3297 |
| 2022/0330305 | A1* | 10/2022 | Wang | H04W 72/0446 |
| 2023/0108015 | A1* | 4/2023 | Mayer | G06N 3/045 |
| | | | | 704/9 |

* cited by examiner

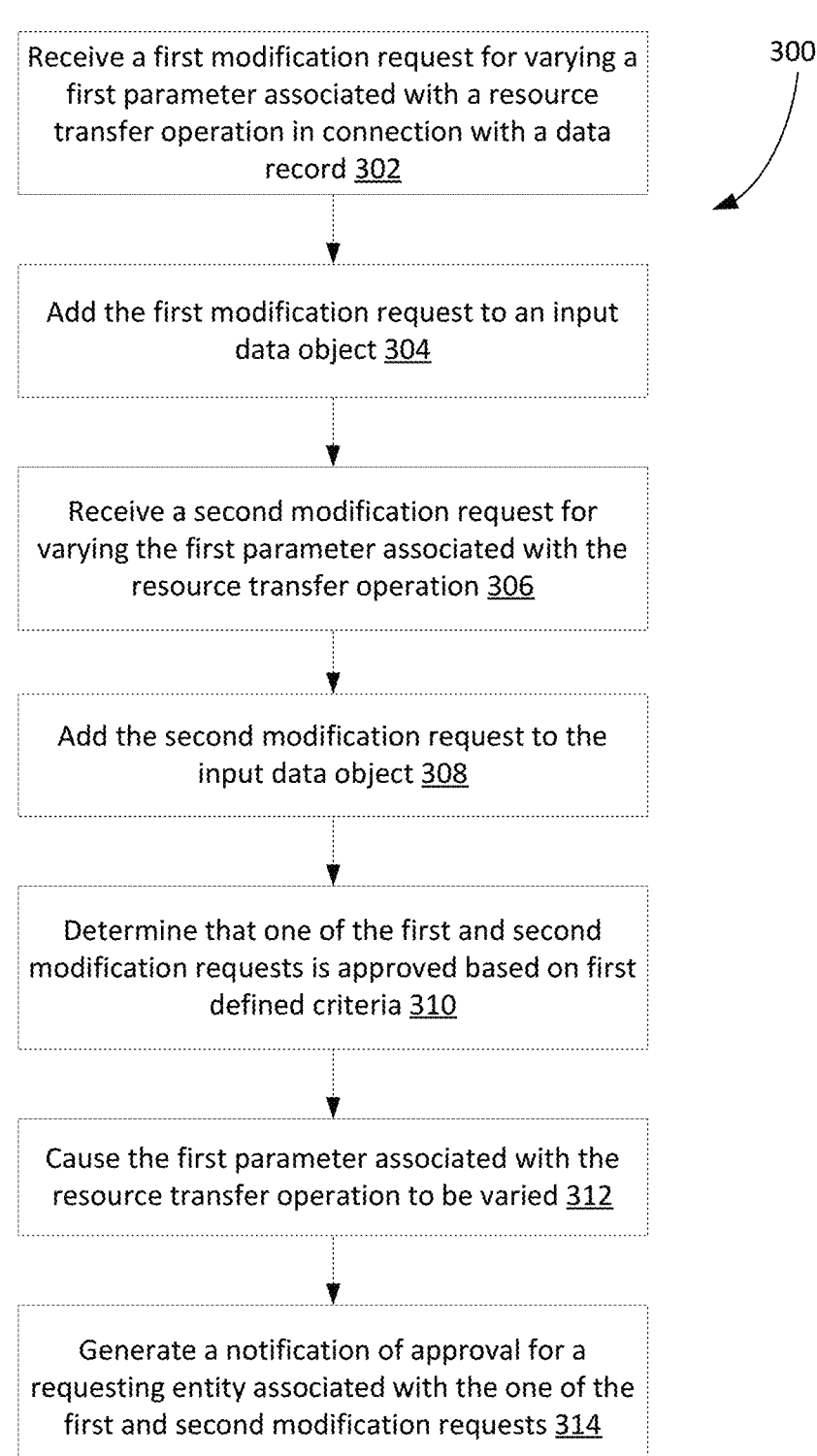

300

Receive a first modification request for varying a first parameter associated with a resource transfer operation in connection with a data record 302

Add the first modification request to an input data object 304

Receive a second modification request for varying the first parameter associated with the resource transfer operation 306

Add the second modification request to the input data object 308

Determine that one of the first and second modification requests is approved based on first defined criteria 310

Cause the first parameter associated with the resource transfer operation to be varied 312

Generate a notification of approval for a requesting entity associated with the one of the first and second modification requests 314

FIG. 3

Obtain input file of modification requests 402

Identify duplicate modification requests in the input file 404

Obtain first criteria for evaluating the modification requests 406

Evaluate modification requests 408

Modify input file to indicate approval decision in connection with each modification request 410

500

Determine adjudication decision of modification request 502

Determine a type of notification to generate for the respective modification requests 504

Transmit the notification to computing device 506

SYSTEM AND METHODS FOR MODIFYING SCHEDULED RESOURCE TRANSFERS ASSOCIATED WITH DATA RECORDS

TECHNICAL FIELD

The present disclosure relates to data processing systems and, in particular, to systems and methods for accessing, modifying and otherwise managing resource transfer operations in connection with resource accounts.

BACKGROUND

A resource server, or a server that is associated with a resource lender entity, may receive and process resource requests from various computing systems. Such server may automatically process the resource requests and provide lending decisions to retailer computing systems and/or client devices associated with prospective purchasers. The resource requests are typically associated with resource accounts. In particular, a borrower entity may request to receive a certain quantum of resources (e.g., data) associated with one or more resource accounts of the borrower entity.

The resources may be required to be eventually transferred back to the source (i.e., lender entity). For example, the borrower entity may transfer resources that are associated with the one or more resource accounts back to the source in accordance with a defined schedule.

BRIEF DESCRIPTION OF DRAWINGS

Reference will now be made, by way of example, to the accompanying drawings which show example embodiments of the present application and in which:

FIG. 3 shows, in flowchart form, an example method for processing modification requests in connection with resource transfer operations for a resource account;

Like reference numerals are used in the drawings to denote like elements and features.

DETAILED DESCRIPTION OF EXAMPLE EMBODIMENTS

Figure 1:
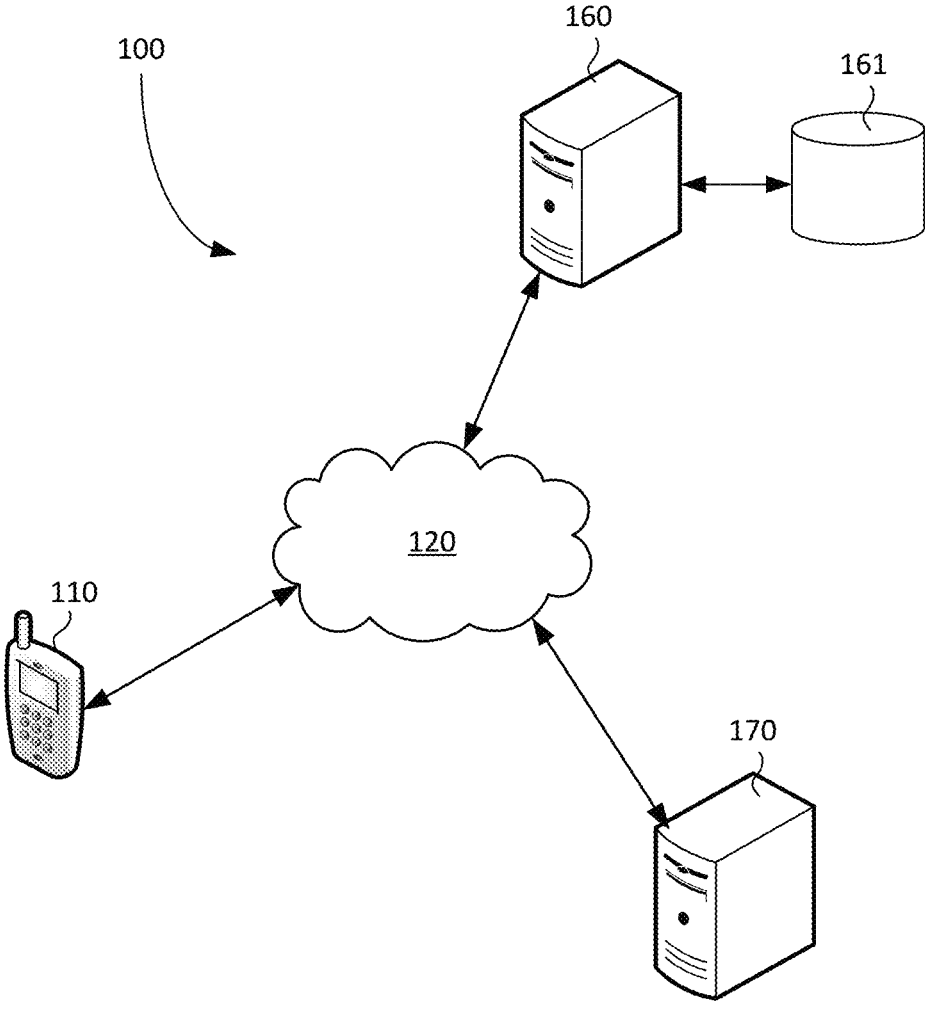
FIG. 1 is a schematic diagram illustrating an operating environment of an example embodiment of the present disclosure.

In one aspect, the present disclosure describes a computing device. The computing device includes a processor, a communications module coupled to the processor, and a memory coupled to the processor. The memory stores instructions that, when executed, configure the processor to: receive, via the communications module over a first communication channel, a first modification request for varying a first parameter associated with a resource transfer operation in connection with a data record; add the first modification request to an input data object; receive, via the communications module over a second communication channel, a second modification request for varying the first parameter associated with the resource transfer operation; add the second modification request to the input data object; determine that one of the first and second modification requests is approved based on first criteria, wherein the determining includes sequentially processing, using a robotic process automation system, a plurality of modification requests of the input data object; in response to determining that one of the first and second modification requests is approved: cause the first parameter associated with the resource transfer operation to be varied; and generate a notification of approval for a requesting entity associated with the one of the first and second modification requests.

In some implementations, the robotic process automation system may be configured to process only those modification requests that are included in the input data object.

In some implementations, the instructions, when executed, may further configure the processor to, prior to sequential processing of modification requests: identify duplicate modification requests in the input data object; and remove the identified duplicate modification requests.

In some implementations, identifying duplicate modification requests may include determining that two or more modification requests in the input data object contain the same modification request data.

In some implementations, determining that one of the first and second modification requests is approved may include determining whether the first parameter was varied as a result of one or more previous modification requests.

In some implementations, determining that one of the first and second modification requests is approved may include evaluating modification request data associated with the first and second modification requests using the first criteria.

In some implementations, adding the first or second modification request to the input data object may include storing modification request data associated with the respective requests in the input data object.

In some implementations, the instructions, when executed, may further configure the processor to: in response to determining that either the first or the second modification request is not approved: store, in the memory, an indication of reasons for denying the one of the first and the second modification requests.

In some implementations, the instructions, when executed, may further configure the processor to transmit, to a computing device associated with the requesting entity, the notification of approval.

In some implementations, the input data object comprises a file containing a list of one or more requests.

In another aspect, a computer-implemented method is disclosed. The method includes: receiving, via a first communication channel, a first modification request for varying a first parameter associated with a resource transfer operation in connection with a data record; adding the first modification request to an input data object; receiving, via a second communication channel, a second modification request for varying the first parameter associated with the resource transfer operation; adding the second modification request to the input data object; determining that one of the first and second modification requests is approved based on first criteria, wherein the determining includes sequentially processing, using a robotic process automation system, a plurality of modification requests of the input data object; in response to determining that one of the first and second modification requests is approved: causing the first parameter associated with the resource transfer operation to be varied; and generating a notification of approval for a requesting entity associated with the one of the first and second modification requests.

In yet another aspect, a non-transitory computer readable storage medium is disclosed. The computer readable storage medium contains instructions thereon which, when executed by a processor, configure the processor to: receive, via a first communication channel, a first modification request for varying a first parameter associated with a resource transfer operation in connection with a data record; add the first modification request to an input data object; receive, via a second communication channel, a second modification request for varying the first parameter associated with the resource transfer operation; add the second modification request to the input data object; determine that one of the first and second modification requests is approved based on first criteria, wherein the determining includes sequentially processing, using a robotic process automation system, a plurality of modification requests of the input data object; in response to determining that one of the first and second modification requests is approved: cause the first parameter associated with the resource transfer operation to be varied; and generate a notification of approval for a requesting entity associated with the one of the first and second modification requests.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Resource lending entities may process resource requests and provide lending decisions. The resources may, for example, comprise computing resources (e.g., CPU, memory, etc.) or stored value (e.g., fiat currency). The resource requests are typically associated with resource accounts. A borrower entity may request to receive a certain quantum of resources (e.g., data) associated with one or more resource accounts of the borrower entity.

The resources may be required to be eventually transferred back to the source (i.e., a lender entity). For example, the borrower entity may transfer resources that are associated with the one or more resource accounts back to the source of the resources in accordance with a defined schedule. In particular, resource transfer operations may be performed in connection with the resource accounts for transferring resources back to the source, where the parameters of the resource transfer operations are determined jointly by the lender and borrower entities. The parameters may, for example, comprise terms and conditions that are agreed to mutually between the lender and borrower entities.

In some instances, one or both of the lender and borrower entities may desire to modify parameters of the resource transfer operations. If a modification is desired, a request may be generated by one of the entities to obtain the approval of the other one of the entities for a proposed modification to the resource transfer operations. In order for resource transfer parameters to be modified, the approval, or consent, of both entities may be required. For example, a proposed change to a schedule of resource transfers by a borrower entity may require the approval of the lender entity for modifying a time parameter associated with one or more of the resource transfer operations in connection with the borrower's resource accounts.

Manual processing of such requests to modify resource transfer operations and parameters associated therewith may result in unintended errors or delays. Any delays which may be introduced by such manual processing can cause subsequent processes and actions to be delayed or to fail entirely. Furthermore, manual processing may result in inconsistent handling of modification requests from different requesting entities and duplication of adjudication decisions.

The present application discloses solutions for automatically processing modification requests in connection with resource transfer operations for a resource account. Specifically, a computing system associated with a resource loan management entity is described. The computing system receives, via a first communication channel, a first modification request for varying a parameter associated with a resource transfer operation in connection with a data record, and the first modification request is added to an input data object. The computing system subsequently receives a second modification request for varying the same parameter, and the second modification request is also added to the input data object. The first and second modification requests are sequentially processed; in particular, a robotic process automation system is employed to process the modification requests of the input data object sequentially. Upon determining that one of the first and second modification requests is approved, the computing system causes the parameter associated with the resource transfer operation to be varied and generates a notification of approval associated with the one of the first and second modification requests.

FIG. 1 is a schematic diagram illustrating an operating environment of an example embodiment. In particular, FIG. 1 illustrates exemplary components of a system 100 for processing modification requests in connection with resource transfer operations for resource accounts. As a specific example, the system 100 of FIG. 1 may be implemented to facilitate adjudication of deferral requests for scheduled transfers by borrower entities in connection with resource loans.

As illustrated, a resource server 160 (which may also be referred to as a server computer system) and client device 110 communicate via the network 120. The client device 110 is a computing device that may be associated with an entity, such as a client, having resources associated with the resource server 160. The client device 110 may take a variety of forms including, for example, a mobile communication device such as a smartphone, a tablet computer, a wearable computer such as a head-mounted display or smartwatch, a laptop or desktop computer, or a computing device of another type.

The resource server 160 may track, manage, and maintain resources, make lending decisions, and/or lend resources to the entity. The resources may, for example, be computing resources, such as memory or processor cycles. By way of further example, the resources may include stored value, such as fiat currency, which may be represented in a database. For example, the resource server 160 may be coupled to a database 161, which may be provided in secure storage. The secure storage may be provided internally within the resource server 160 or externally. The secure storage may, for example, be provided remotely from the resource server 160. For example, the secure storage may include one or more data centers. The data centers may, for example, store data with bank-grade security.

In some embodiments, the system 100 may include a resource loan management server (not shown in FIG. 1) that is independent of the resource server 160. A resource loan management server may implement a service which adjudicates requests to modify scheduled resource transfer operations. In particular, the service may render decisions regarding requests to modify one or more parameters associated with scheduled resource transfers in connection with resource loans. This service may be implemented by a server that is different from the resource server 160. For example, a resource loan management server that is communicably connected to the resource server 160 and has access to resource accounts data that is maintained by the resource server 160 may be configured to provide an adjudication service for modification requests in connection with resource transfer operations. In some embodiments, the resource server 160 may itself implement the resource loan management service. For example, the resource server 160 may include software modules that perform the functions of the resource loan management service. The module may be configured to, for example, process modification requests for scheduled resource transfer operations in connection with resource loans associated with data records maintained (and/or managed) by the resource server 160.

The database 161 may include data records for a plurality of accounts and at least some of the data records may define a quantity of resources associated with an entity. For example, the entity that is associated with the client device 110 may be associated with an account having one or more data records in the database. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated data record such as, for example, a bank balance.

The resource server 160 may, for example, be a financial institution server that is operated by a financial institution and the entity may be a customer of the financial institution.

The client device 110 may be used, for example, to configure a resource transfer from a resource account associated with the client device 110. More particularly, the client device 110 may be used to configure a resource transfer from a resource account associated with an entity operating the client device 110. The resource transfer may involve a transfer of data between a data record in the database 161 associated with such an account and another data record in the database 161 (or in another database, such as a database associated with another server that is coupled to the resource server 160 via a network). The other data record may be associated with a data transfer recipient such as, for example, a bill payment recipient. The data involved in the transfer may, for example, be units of value and the data records involved in the data transfer may be adjusted in related or corresponding manners. For example, during a data transfer, a data record associated with the data transfer recipient may be adjusted to reflect an increase in value due to the transfer whereas the data record associated with the entity initiating the data transfer may be adjusted to reflect a decrease in value which is at least as large as the increase in value applied to the data record associated with the data transfer recipient.

The resource server 160 may be in communication with a resource usage tracking server 170 via the network 120. The resource usage tracking server 170 may maintain a history of resource borrowing by various entities including, for example, the entity associated with the client device 110 and associated with an account having one or more data records in the database 161.

Additionally, or alternatively, the resource usage tracking server 170 may maintain historical resource usage data associated with the various entities. Such data may be maintained on a per-entity basis, with each entity having its own associated historical resource usage data. The historical resource usage data may identify, for example, third parties that have a credit relationship with the entity associated with a particular instance of the historical resource usage data, such as a particular record of the historical resource usage data. The historical resource usage data may, for example, be a credit report. A credit report is a record of a borrower's credit history from a number of sources including, for example, credit card companies, banks, collection agencies and/or governments. A credit score, which is a numerical representation of a borrower's creditworthiness, may be obtained based on a credit report. The historical resource usage data, such as the credit report, may identify various resource event data including, any one or a combination of: a borrowed resource history (e.g., a credit history), a resource transfer history (e.g., a record of payments including, for example, an indication of whether such payments were on time or late), failed transfer information (e.g., information regarding cheques that were returned for having non-sufficient funds and/or information about accounts that were sent to a collection agency, bureau or process due to non-transfer of resources), resource shortage information (e.g., data regarding prior bankruptcies or other data indicating that an entity had insufficient resources to satisfy data transfer requirements), borrowed resource information (e.g., information about loans including secured and unsecured loans), and/or data of another type.

In some embodiments, the resource event data may include a third-party identifier. The third-party identifier may, for example, be a name of a third party that is associated with such data. The name of a third party that added or caused to be added an entry to the historical resource usage data may be identified. By way of example, the resource transfer history may identify a plurality of third parties who have a past history of requesting and/or receiving transfers from the entity. By way of further example, the failed transfer information may identify a third party that was to be the recipient of the failed transfer. By way of further example, the borrowed resource information may identify a third party that previously lent resources to the entity.

In some embodiments, the resource event data may include identification information that a defined third-party would associate with the entity. For example, an account number, a partial account number, or other customer identifier may be included in the historical resource usage data. By way of example, the historical resource usage data may indicate that a given third party (e.g., "The Phone Company") identifies the entity with a defined account number (e.g., 798126).

The historical resource usage data may include other information instead of or in addition to the information defined above. For example, the historical resource usage data may include a listing of third parties that have previously retrieved and/or requested historical resource usage data maintained by the resource usage tracking server 170 (e.g., a listing of third parties that previously requested a credit report). By way of further example, the historical resource usage data may include identification and/or biographical information for the entity. Such information may include, for example, any one or more of: a name, address, date of birth, marital status, current and/or past employment information (e.g., a title, a date of employment, income amount, name of employer, etc.), contact information (such as a telephone number, etc.), a government issued identification number (e.g., a social insurance number (SIN), a passport number and/or driver's license number), or other information.

Various entries of data, such as, for example, the resource event data, may include a date associated therewith. The date may, for example, be a reporting and/or verification date. The date may reflect freshness of the associated entry of data such that entries with a more recent date may be considered to be fresher than entries with an older date.

The resource usage tracking server 170 may include an application programming interface (API) that allows the resource server 160 to request for and receive historical resource usage data for an entity. By way of example, the API may allow the resource server 160 to retrieve the historical resource usage data for an entity by sending a message which includes identification information for the entity to the resource usage tracking server 170. The identification information may, for example, include any one or combination of: a name, government issued identification number, an address, a date of birth, contact information (e.g., a telephone number), or identification of another type. The resource usage tracking server 170 uses such identification information to retrieve a historical resource usage data associated with the entity. For example, an appropriate record in a database may be retrieved based on the identification information. The resource usage tracking server 170 may then send the historical resource usage data for the entity to the resource server 160.

As described above, the client device 110, the resource server 160, and the resource usage tracking server 170 may be computer systems. The client device 110, the resource server 160, and the resource usage tracking server 170 may be in geographically disparate locations. Put differently, the client device 110 may be remote from at least one of the resource server 160 and the resource usage tracking server 170.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource server 160 may provide both data transfer processing (e.g., bill payment) and data holding (e.g., banking) functions. That is, the resource server 160 may be both a financial institution server and also a bill payment processing server. The resource server 160 may, in some embodiments, be a proxy server, serving as an intermediary for requests for client devices 110 seeking resources from other servers.

Figure 2A:
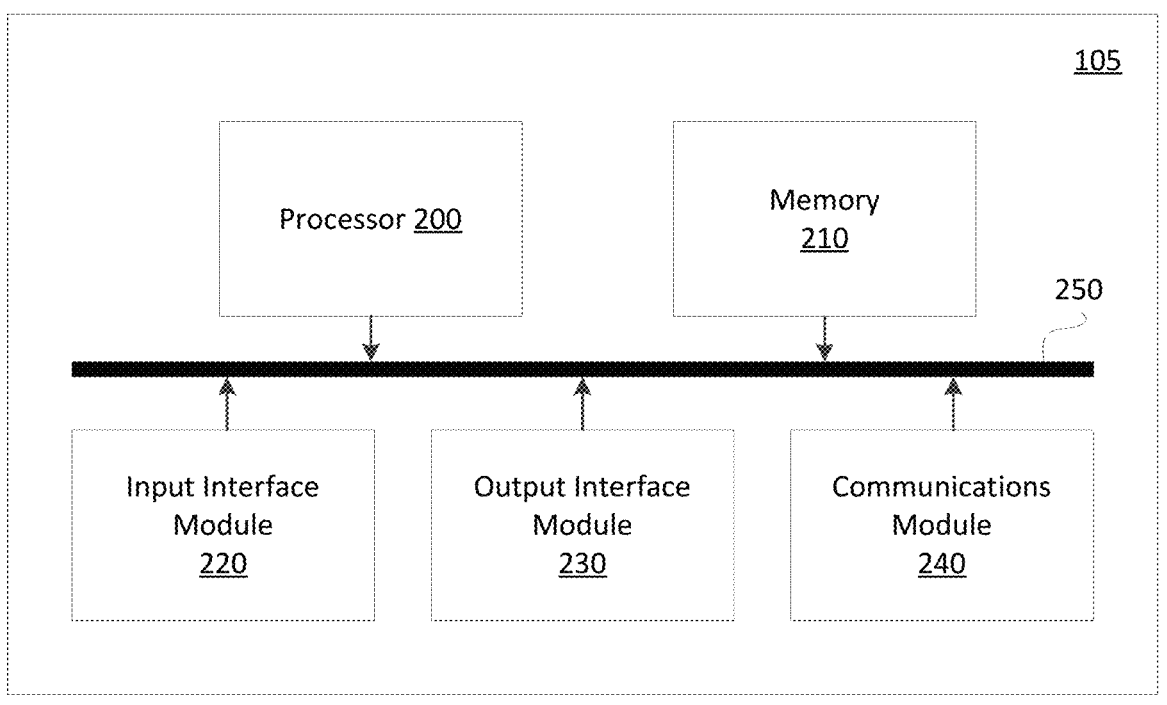
FIG. 2A is a high-level schematic diagram of an example computing device.

FIG. 2A is a high-level operation diagram of the example computing device 105. In at least some embodiments, the example computing device 105 may be exemplary of one or more of the client device 110, the resource server 160 and the resource usage tracking server 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
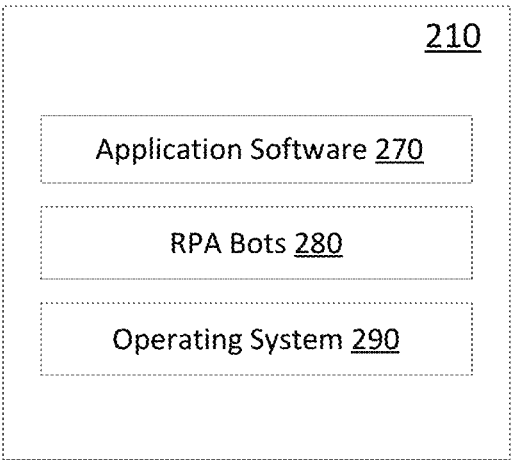
FIG. 2B shows a simplified organization of software components stored in memory of the example computing device of FIG. 2A.

FIG. 2B depicts a simplified organization of software components stored in memory 210 of the example computing device 105. As illustrated, these software components may include application software 270, robotic process automation (RPA) bot(s) 280, and an operating system 290.

The application software 270 adapts the example computing device 105, in combination with the operating system 290, to operate as a device performing particular functions. While a single application software 270 is illustrated in FIG. 2B, in operation, the memory 210 may include more than one application software 270 and different application software 270 may perform different operations.

In the example of FIG. 2B, the example computing device 105 includes one or more RPA bots 280, or software robots, that are executable by a processor (such as processor 200). The RPA bots 280 may be configured to perform various robotic tasks, based on instructions that are defined for the tasks and stored, for example, in the memory 210. An RPA bot 280 may be associated with one or more sub-bots or routines, which may also be stored in the memory 210. Upon completion of a robotic task, the RPA bots 280 may generate specific output(s) or otherwise notify a computing system that the task has been completed.

The operating system 290 is software. The operating system 290 allows the application software 270 and RPA bots 280 to access the processor 200, the memory 210, the input interface module 220, the output interface module 230 and the communications module 240. The operating system 290 may be, for example, Apple iOS™, Google™'s Android™, Linux™, Microsoft™ Windows™, or the like.

Reference is made to FIG. 3, which shows, in flowchart form, an example method 300 for processing modification requests in connection with resource transfer operations for a resource account. A computing system may handle resource transfer modification requests for a plurality of resource accounts, in accordance with method 300. In particular, a computing system may implement the method 300 (or parts thereof) when processing approval data in connection with resource transfer modification requests from resource borrowing entities.

Operations 302 and onward are performed by one or more processors of a computing device such as, for example, the processor 200 (FIG. 2) of a suitably configured instance of the example computing device 105 (FIG. 2). The method 300 may be performed, for example, by a server that has access to and manages data records of a plurality of resource accounts. In particular, a server configured for managing resource accounts, such as the resource server 160, may implement the method 300. For example, a server may implement the method 300 for adjudicating modification requests for varying one or more parameters of resource transfer operations associated with resource accounts that are managed by the server.

In operation 302, the server receives, via a communications module associated with the server, a first modification request for varying a first parameter associated with at least one resource transfer operation in connection with a data record. The first modification request is transmitted to the server over a first communication channel. In at least some embodiments, the at least one resource transfer operation may be a transfer that is initiated or intended to be initiated by a resource borrowing entity. In particular, the resource transfer operation may be a transfer of resources back to a source (e.g., resource lending entity) of borrowed resources. For example, the resource transfer operation may be one of a set of scheduled transfers from one or more resource accounts of a borrower entity to a lender entity in connection with a resource loan.

The resource transfer operation may be associated with one or more defined parameters. Examples of transfer parameters include, for example, quantum of resources for transfer, date/time of transfer (e.g., a transfer schedule), identity of transfer recipient(s), number and frequency of transfer operations, previously processed modifications to the transfer, etc. The transfer parameters may be defined by one or both of the borrower and lender entities. In some embodiments, the transfer parameters may be stored in association with one or more of the resource accounts of the borrower entity. For example, the transfer parameters of one or more scheduled transfers from data records associated with resource accounts of the borrower entity may be stored as part of account data of those resource accounts.

The first communication channel may be one of a plurality of channels by which the server may receive communication from entities that are associated with resource accounts. The first communication channel may comprise one of: a mobile application, a web application, a phone call (e.g., call with a customer service agent), a message (e.g., email, SMS message, etc.), and the like. For example, the first modification request may be received via a mobile or web application for accessing and managing resource accounts. The first modification request may be inputted via a user interface associated with the mobile/web application. The request data for the first modification request may include, among others, borrower entity identity, account/data record identifier, and indication of requested modification(s) to the resource transfer operation(s).

In operation 304, the server adds the first modification request to an input data object. That is, the request data associated the first modification request is stored in an input data object. In some embodiments, the input data object may be a digital file (e.g., a spreadsheet document) object that is formatted for storing data. In particular, the input data object may be a document that stores request data for modification requests in connection with resource transfers that are associated with one or more resource accounts. The input data object may, for example, be a file that contains a list of a plurality of modification requests.

In operation 306, the server receives, via a second communication channel, a second modification request for varying the first parameter associated with the resource transfer operation. In at least some embodiments, the second communication channel may be different from the first communication channel. That is, the second modification request may be received via a different communication channel than the first modification request. The first and second modification requests may be inputted by the same entity or different entities, and may relate to resource transfers associated with a single resource account or different resource accounts.

In operation 308, the server adds the second modification request to the input data object. In particular, the request data associated with the second modification request is stored in the same input data object that stores the request data associated with the first modification request. The first and second modification requests may be represented by different data entries in the input data object. Specifically, the request data of the first modification request may be contained in a first data entry that is different from a second data entry containing the request data of the second modification request, and the first and second data entries may be included or stored in the input data object.

In operation 310, the server determines, using a robotic process automation (RPA) system, that one of the first and second modification requests is approved based on first criteria. The server sequentially processes the modification requests of the input data object using the RPA system. In at least some embodiments, one or more RPA bots may be employed to operate on the input data object. In particular, an RPA bot is configured to determine whether the modification requests of the input data object are approved based on defined rules and/or criteria. The RPA bot is a software component, or module, that is associated with the server. For example, the RPA bot may comprise software instructions that are stored in a memory associated with the server. The RPA bot may evaluate request data of the modification requests in order to determine which of the modification requests of the of the input data object should be approved.

The RPA bot operates on the modification requests of the input data object sequentially. More specifically, the modification requests may be processed according to an order of being added to the input data object, i.e., first-in-first-out. That is, a modification request that is added to the input data object prior to another modification request being added to the input data object is processed before said other modification request. The RPA bot may be configured to process only those modification requests that are included in the input data object. In particular, the RPA bot may not process and adjudicate modification requests that are not added to the input data object.

The request data associated with the first and second modification requests are evaluated using the first criteria. More specifically, the request data may comprise values for one or more data fields associated with the modification requests, and the values may be evaluated against the first criteria. Based on the evaluation of the request data by the RPA bot, a modification request may be approved or rejected. The first criteria may be stored, for example, in memory associated with the server. In some embodiments, the first criteria may be obtained from an external data source such as an external server and/or data store.

In at least some embodiments, the first criteria may comprise one or more rules defining when a modification request is to be automatically approved by the RPA bot. For example, the first criteria may include a rule indicating a defined number of modifications to the first parameter that are allowed if certain conditions or events (e.g., emergency, natural disaster, etc.) in connection with the borrower entity are detected. If the RPA bot determines that said conditions are satisfied or detects said events, the modification request associated with the borrower entity may be automatically approved. As another example, the first criteria may indicate certain request data values or flags associated with a modification request in the input data object that causes the modification request to be automatically approved. The flags may, for example, comprise indications of past events associated with the borrower entity (e.g., a past bankruptcy, a past repossession of property, litigation history, previous modifications to resource transfer parameters, etc.).

In some embodiments, the RPA bot may determine whether a previous request to modify the first parameter associated with the resource transfer operation was already approved. That is, the RPA bot may determine whether the first parameter was varied as a result of one or more previous modification requests. In this way, the RPA bot (and the server) may check for any duplicate modification requests and prevent processing of such requests. "Duplicate modification requests" may represent a single request that is submitted multiple times or multiple different requests. For example, duplicate modification requests may exist in the input data object if a modification request is erroneously submitted multiple times over a single communication channel or if different requests to vary the same parameter of a scheduled resource transfer in connection with a resource loan are submitted (e.g., over different communication channels). The RPA bot may obtain historical modifications data indicating previous modifications for scheduled transfer operations in connection with one or more resource loans. By comparing the request data of the first and/or second modification requests against the historical modifications data, the RPA bot may identify duplicate modification requests, for example, to vary the same parameter for a scheduled resource transfer in connection with a resource loan.

In response to determining that one of the first and second modification requests is approved, the server causes the first parameter associated with the resource transfer operation to be varied, in operation 312. In particular, the requested modification to the first parameter may be approved and said approval may be processed by the server. For example, an indication of the approval decision and a modified first parameter may be stored in association with the one of the first and second modification requests.

In operation 314, the server generates a notification of approval for a requesting entity associated with one of the first and second modification requests. More particularly, a notification of the decision to approve the modification request is generated for transmission to a requesting party (e.g., borrower entity) associated with the modification request. In at least some embodiments, the notification may be delivered electronically. By way of example, a message (e.g., email, SMS message, and the like) may be sent to the borrower entity.

If, however, the RPA bot rejects the first and/or the second modification request, an indication of the rejection may be stored in association with the modification request in the input data object. That is, in response to determining that either the first or the second modification request is not approved, an indication of the rejection decision may be stored. For example, the adjudication decision may be stored as a data field associated with the modification request. In some embodiments, an indication of reasons for the rejection may also be stored in association with the modification request.

Figure 4:
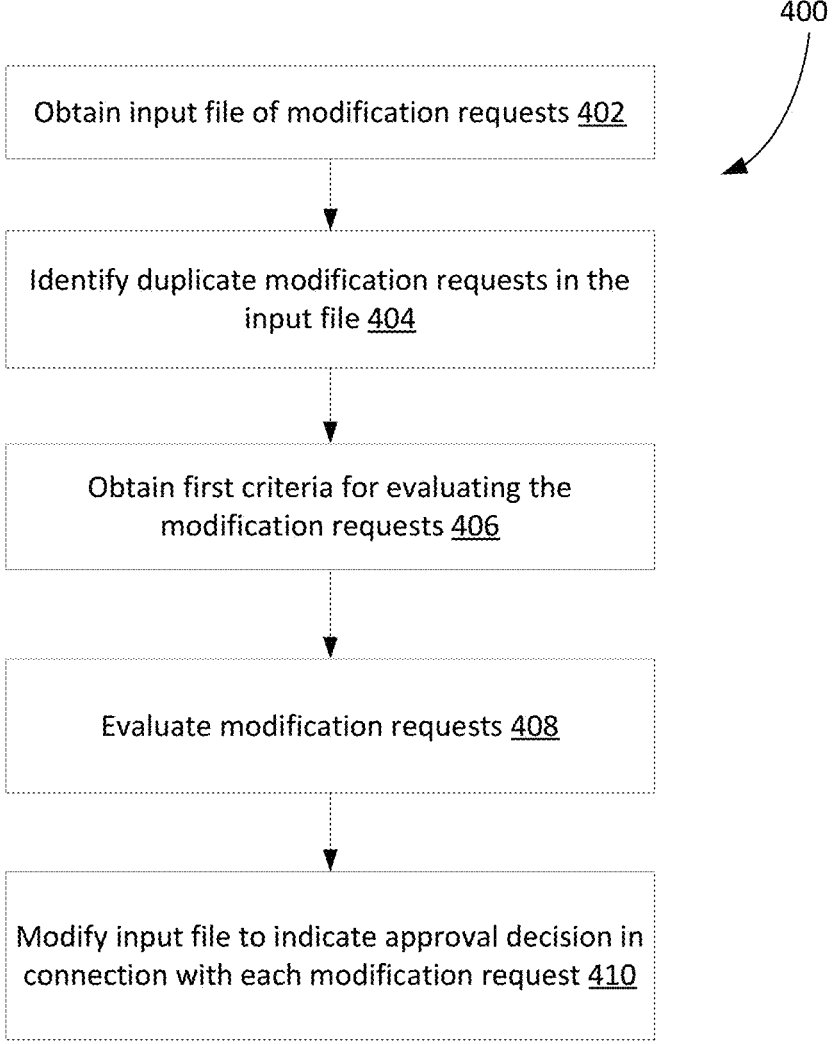
FIG. 4 shows, in flowchart form, another example method for processing modification requests in connection with resource transfer operations for a resource account.

Reference is made to FIG. 4, which shows, in flowchart form, another example method 400 for processing modification requests in connection with resource transfer operations for a resource account. A computing system may handle resource transfer modification requests for a plurality of resource accounts, in accordance with method 400. Operations 402 and onward are performed by one or more processors of a computing device such as, for example, the processor 200 (FIG. 2) of a suitably configured instance of the example computing device 105 (FIG. 2). The method 400 may be performed, for example, by a server that has access to and manages data records of a plurality of resource accounts. In particular, a server configured for managing resource accounts, such as the resource server 160, may implement the method 400. The operations of method 400 may be performed in addition to, or as alternatives of, one or more operations of method 300.

In operation 402, the server obtains an input file of modification requests for varying a parameter associated with a resource transfer operation. The input file may, for example, comprise a data object such as a document (e.g., a spreadsheet document) containing a list of modification requests in connection with scheduled resource transfers associated with resource loans. The server may receive the input file, for example, via a computing device that transmits the input file to the server, or the server may compile the input file based on modification requests that are received by the server. In particular, the input file may be generated by the server based on one or more modification requests from requesting parties (e.g., borrower entities).

In operation 404, the server identifies any duplicate modification requests in the input file. That is, before any adjudication of the modification requests is conducted, the input file may be processed to remove duplicate modification requests. Duplicate requests may exist when a requesting party submits requests through multiple different channels or where the requesting party unintentionally submits multiple requests due to technical errors (e.g., multiple selection of a user interface element for submitting a modification request).

In at least some embodiments, the server may obtain request data associated with the modification requests of the input file and perform comparisons of the request data to identify any duplicate information. For example, the values of data fields associated with different modification requests of the input file may be compared in order to determine whether a request to vary a parameter of a resource transfer is represented multiple times in the modification requests of the input file. If two or more of the modification requests contain a same value for a data field of the request data, the server may determine that there are duplicate requests in the input file.

The disposition of duplicate requests may be conducted in various different ways. In some embodiments, given a set of identified duplicate requests, the server may designate one of the duplicate requests as a request to keep in the input file and delete the request data associated with the other ones of the duplicate requests from the input file. For example, the designated request may be the request that is the first among the duplicate requests according to a defined order. In particular, the order may be a chronological order of receipt or inclusion in the input file. The request data of the subsequent duplicate requests (i.e., each request received or included in the input file after the first request) may thus be removed/deleted from the input file.

In some embodiments, the server may determine which of the duplicate requests is most suitable for processing in the adjudication of modification requests of the input file. For example, the selected one of the duplicate requests may be the modification request with request data that contains the most amount of information (e.g., highest number of data fields and associated values). As another example, the selected one of the duplicate requests may be the modification request that is received via a preferred communication channel (e.g., a phone call with a customer service agent, input via a web/mobile app interface, etc.). In particular, the duplicate requests that are not received via the preferred communication channel may be removed/deleted from the input file.

In operation 406, the server obtains first criteria for evaluating the modification requests. The first criteria may comprise one or more rules for determining which of the modification requests of the input file are to be automatically approved. The server evaluates the modification requests based on the first criteria, in operation 408. In particular, an RPA system or bot associated with the server may evaluate the modification requests sequentially in order to determine which of the requests should be approved and which should be rejected.

In operation 410, the server modifies the input file to indicate an approval decision in respect of each of the modification requests in the input file. The approval decision for a modification request may comprise an indication of approval or rejection of the request to modify a parameter associated with a resource transfer in connection with a data record/resource account. In some embodiments, the server may modify the input file to include a data field for indicating the approval decision associated with the modification requests. The value of this data field in the input file may be updated as adjudication of the modification requests proceeds sequentially.

Figure 5:
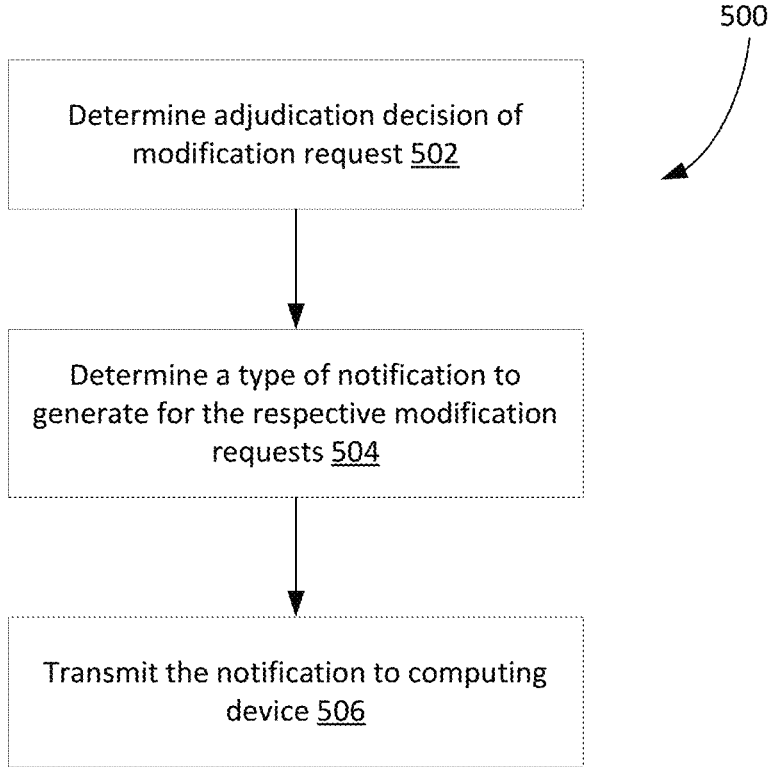
FIG. 5 shows, in flowchart form, an example method for providing notifications to an entity associated with a resource account in connection with one or more resource transfer modification requests.

Reference is made to FIG. 5, which shows, in flowchart form, an example method 500 for providing notifications to an entity associated with a resource account in connection with one or more resource transfer modification requests. A computing system may handle resource transfer modification requests for a plurality of resource accounts, in accordance with method 500. In particular, the method 500 may enable a computing system to process approval data in connection with resource transfer modification requests originating from resource borrowing entities.

Operations 502 and onward are performed by one or more processors of a computing device such as, for example, the processor 200 (FIG. 2) of a suitably configured instance of the example computing device 105 (FIG. 2). The method 500 may be performed, for example, by a server that has access to and manages data records of a plurality of resource accounts. In particular, a server configured for managing resource accounts, such as the resource server 160, may implement the method 500. For example, a server may implement the method 500 for adjudicating modification requests for resource transfers associated with one or more resource accounts that are managed by the server. The operations of method 500 may be performed in addition to, or as alternatives of, one or more operations of methods 300 and 400.

Upon completing adjudication of the modification requests, the server may iterate through the modification requests and determine an adjudication decision for the respective requests, in operation 502. For example, request data associated with the modification requests may be contained in a data object (e.g., a document file) and the server may iterate through the modification requests of the data object to identify an approval decision/status that has been rendered for each of the respective modification requests.

In operation 504, the server determines, for each modification request, a type of notification to generate. In some embodiments, the type of notification may depend on the communication channel by which the modification request was received. For example, the server may generate a notification that is suitable for transmitting via the same communication channel by which the modification request was made by the requesting party (e.g., borrower entity). In some embodiments, the type of notification may depend on whether the adjudication decision is an approval decision or a rejection decision. In particular, the notifications for approval and rejection decisions associated with the modification requests may be of different types.

In operation 506, the server transmits the generated notification to suitable computing devices. In particular, the notifications are sent to client devices of requesting parties that are associated with the modification requests. In some embodiments, the notifications are sent via a suitably selected communication channel for the respective modification requests. For example, the notifications may be sent via the same communication channel by which the modification request was received by the server.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:

a processor; and a memory coupled to the processor, the memory storing instructions that, when executed, configure the processor to:

obtain an input data file containing modification requests for varying parameters associated with scheduled resource transfer operations in connection with a data record;

receive, over a first communication channel, a first modification request for varying a first parameter associated with a first scheduled resource transfer operation in connection with the data record;

receive, over a second communication channel, a second modification request for varying the first parameter associated with the first scheduled resource transfer operation;

store request data associated with the first and second modification requests in the input data file;

identify duplicate requests in the input data file to modify a parameter associated with the first scheduled resource transfer operation based on comparing request data of modification requests stored in the input data file;

select one of the duplicate requests for processing in adjudication of the modification requests and delete request data associated with the non-selected ones of the duplicate requests from the input data file;

determine that one of the modification requests in the input data file is approved based on first criteria comprising rules defining at least one detectable event associated with a transferor entity for automatically approving modification requests, wherein the determining includes sequentially evaluating, using a robotic process automation system, request data of a plurality of modification requests stored in the input data file using the first criteria and wherein the at least one detectable event comprises a natural disaster;

in response to the determining:

process the approved one of the modification requests based on modifying a schedule of transfer operations associated with the data record by causing the first parameter associated with the first scheduled resource transfer operation to be varied;

modify the input data file to indicate an approval decision in respect of the approved one of the modification requests to modify the first parameter based on updating an approval data field of the input data file during sequential processing of modification requests represented in the input data file;

generate a notification of approval for a requesting entity associated with the approved one of the modification requests; and execute transfer operations for transferring resources associated with the data record in accordance with the modified schedule.

2. The computing system of claim 1, wherein the robotic process automation system is configured to compare request data of modification requests that are included in the input data file against the first criteria.

3. The computing system of claim 1, wherein determining that one of the modification requests is approved comprises determining whether the first parameter was varied as a result of one or more previous modification requests.

4. The computing system of claim 1, wherein determining that one of the modification requests is approved comprises evaluating modification request data associated with the modification requests using the first criteria.

5. The computing system of claim 1, wherein the instructions, when executed, further configure the processor to:

in response to determining that a modification request in the input data file is not approved:

store, in the memory, an indication of reasons for denying the non-approved one of the modification requests.

6. The computing system of claim 1, wherein the instructions, when executed, further configure the processor to transmit, to a computing device associated with the requesting entity, the notification of approval.

7. The computing system of claim 1, wherein the first scheduled resource transfer operation is one of a set of scheduled transfers from one or more resource accounts of a borrower entity to a lender entity.

8. The computing system of claim 1, wherein the request data associated with the first and the second modification requests comprise values for one or more data fields associated with the modification requests and wherein the values are evaluated against the first criteria.

9. A computer-implemented method, comprising:

obtaining an input data file containing modification requests for varying parameters associated with scheduled resource transfer operations in connection with a data record;

receiving, via a first communication channel, a first modification request for varying a first parameter associated with a first scheduled resource transfer operation in connection with the data record;

receiving, via a second communication channel, a second modification request for varying the first parameter associated with the first scheduled resource transfer operation;

storing request data associated with the first and second modification requests in the input data file;

identifying duplicate requests in the input file to modify a parameter associated with the first scheduled resource transfer operation based on comparing request data of modification requests stored in the input data file;

selecting one of the duplicate requests for processing in adjudication of the modification requests and delete request data associated with the non-selected ones of the duplicate requests from the input data file;

determining that one of the modification requests in the input data file is approved based on first criteria comprising rules defining at least one detectable event associated with a transferor entity for automatically approving modification requests, wherein the determining includes sequentially evaluating, using a robotic process automation system, request data of a plurality of modification requests stored in the input data file using the first criteria and wherein the at least one detectable event comprises a natural disaster;

in response to the determining:

process the approved one of the modification requests based on modifying a schedule of transfer operations associated with the data record by causing the first parameter associated with the first scheduled resource transfer operation to be varied;

modifying the input data file to indicate an approval decision in respect of the approved one of the modification requests to modify the first parameter based on updating an approval data field of the input data file during sequential processing of modification requests represented in the input data file;

generating a notification of approval for a requesting entity associated with the approved one of the modification requests; and executing transfer operations for transferring resources associated with the data record in accordance with the modified schedule.

10. The method of claim 9, wherein the robotic process automation system is configured to compare request data of modification requests that are included in the input data file against the first criteria.

11. The method of claim 9, wherein determining that one of the modification requests is approved comprises determining whether the first parameter was varied as a result of one or more previous modification requests.

12. The method of claim 9, further comprising:

in response to determining that a modification request in the input data file is not approved:

storing, in a memory, an indication of reasons for denying the non-approved one of the modification requests.

13. The method of claim 9, further comprising transmitting, to a computing device associated with the requesting entity, the notification of approval.

14. The method of claim 9, wherein the first scheduled resource transfer operation is one of a set of scheduled transfers from one or more resource accounts of a borrower entity to a lender entity.

15. The method of claim 9, wherein the request data associated with the first and the second modification requests comprise values for one or more data fields associated with the modification requests and wherein the values are evaluated against the first criteria.

* * * * *